US008897355B2

(12) United States Patent
Amitay et al.

(10) Patent No.: US 8,897,355 B2
(45) Date of Patent: Nov. 25, 2014

(54) CACHE PREFETCH DURING MOTION ESTIMATION

(75) Inventors: Amichay Amitay, Hod Hasharon (IL); Alexander Rabinovitch, Kfar Yona (IL); Leonid Dubrovin, Karney Shomron (IL)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 597 days.

(21) Appl. No.: 13/307,393

(22) Filed: Nov. 30, 2011

(65) Prior Publication Data

US 2013/0136181 A1 May 30, 2013

(51) Int. Cl.
*H04N 7/32* (2006.01)
*G06F 12/06* (2006.01)

(52) U.S. Cl.
USPC ........................................................ 375/240

(58) Field of Classification Search
CPC . H04N 7/50; H04N 7/26244; H04N 7/26271; H04N 7/465; H03M 7/30
USPC .................................................... 375/240.16
See application file for complete search history.

(56) References Cited

U.S. PATENT DOCUMENTS

| | | | | |
|---|---|---|---|---|
| 6,279,062 B1* | 8/2001 | Adiletta et al. | ................. | 710/68 |
| 6,430,317 B1* | 8/2002 | Krishnamurthy et al. | .... | 382/236 |
| 6,434,196 B1* | 8/2002 | Sethuraman et al. | .... | 375/240.12 |
| 6,879,266 B1* | 4/2005 | Dye et al. | ......................... | 341/51 |
| 7,129,860 B2* | 10/2006 | Alvarez et al. | .................. | 341/51 |
| 7,219,173 B2* | 5/2007 | Sha et al. | ......................... | 710/61 |
| 7,843,993 B2* | 11/2010 | Park | .......................... | 375/240.03 |
| 7,933,331 B2* | 4/2011 | Gallant et al. | ............ | 375/240.14 |
| 8,225,043 B1* | 7/2012 | Kohn et al. | .................... | 711/118 |
| 8,472,527 B2* | 6/2013 | Madumbu et al. | ........ | 375/240.21 |
| 8,619,862 B2* | 12/2013 | Gaedke et al. | ............ | 375/240.16 |
| 8,732,409 B2* | 5/2014 | Van Der Wolf et al. | ....... | 711/143 |
| 2001/0054131 A1* | 12/2001 | Alvarez et al. | ................ | 711/105 |
| 2004/0247029 A1* | 12/2004 | Zhong et al. | ............. | 375/240.16 |
| 2007/0201559 A1* | 8/2007 | He | ............................ | 375/240.24 |
| 2009/0006665 A1* | 1/2009 | Sankaran et al. | ................ | 710/22 |
| 2009/0327611 A1* | 12/2009 | Fang et al. | ..................... | 711/128 |
| 2011/0093854 A1* | 4/2011 | Blanc et al. | .................... | 718/101 |

OTHER PUBLICATIONS

Zheng, Weiguo, et al., "Adaptive Motion Search With Elastic Diamond for MPEG-4 Video Coding", 2001 IEEE, pp. 377-380.

(Continued)

*Primary Examiner* — Sath V Perungavoor
*Assistant Examiner* — Howard D Brown, Jr.
(74) *Attorney, Agent, or Firm* — Christopher P. Maiorana, PC

(57) ABSTRACT

An apparatus having a cache and a processor. The cache may be configured to (i) buffer a first subset of reference samples of a reference picture to facilitate a motion estimation of a current block and (ii) prefetch a second subset of the reference samples while a first search pattern is being tested. The first search pattern used in the motion estimation generally defines multiple motion vectors to test. The reference samples of the second subset may be utilized by a second search pattern in the motion estimation of the current block. The prefetch of the second subset may be based on a geometry of the first search pattern and scores of the motion vectors already tested. The processor may be configured to calculate the scores of the motion vectors by a block comparison of the reference samples to the current block according to the first search pattern.

20 Claims, 13 Drawing Sheets

(56) References Cited

OTHER PUBLICATIONS

Lopez-Estrada, Alex, "Understanding Memory Access Characteristics of Motion Estimation Algorithms", http://software.intel.com/en-us/articles/a11/1/, May 7, 2008, 8 pages.

Dias, Tiago, et al., "Reconfigurable Architectures and Processors for Real-Time Video Motion Estimation", J Real-Time Image Proc (2007), pp. 191-205.

Tsai, Chuan-Yung, et al., "Low Power Cache Algorithm and Architecture Design for Fast Motion Estimation in H.264/AVC Encoder System", 2007 International Conference on Acoustics, Speech, and Signal Processing, 2007, pp. II-97 through II-100.

Zatt, Bruno, et al., "Run-Time Adaptive Energy-Aware Motion and Disparity Estimation in -Multiview Video Coding", Design Automation Conference, Jun. 2011, pp. 1026-1031.

* cited by examiner

CACHE PREFETCH DURING MOTION ESTIMATION

FIELD OF THE INVENTION

The present invention relates to motion estimation generally and, more particularly, to a method and/or apparatus for implementing a cache prefetch during motion estimation.

BACKGROUND OF THE INVENTION

Motion estimation in video compression exploits temporal redundancy within a video sequence for efficient coding. A block matching technique is widely used in the motion estimation. A purpose of the block matching technique is to find another block from a video object plane that matches a current block in a current video object plane. The matching block can be used to discover temporal redundancy in the video sequence thereby increasing the effectiveness of interframe video coding. Since a full motion estimation search for all possible hypothetical matches within a search range is intensive in terms of processing power, alternative sub-optimal techniques are commonly used. The sub-optimal techniques search a low number of hypotheses while maintaining a minimal amount of quality degradation.

A problem in implementing sub-optimal search patterns is the resulting non-subsequent memory accesses. The non-subsequent memory accesses are caused by having a starting point for each search pattern in a given iteration being determined by the best hypothesis of the previous iteration. Such accesses to memory involve stalls (i.e., dead cycles within a core pipeline) which occur between each iteration. The stalls increase the number of processing cycles used in the motion estimation to perform the block matching. The stalls are conventionally avoided by reading the entire search area into an internal zero wait state memory. However, reading the entire search area is a large internal expense and uses large die size memory.

It would be desirable to implement a cache prefetch during motion estimation.

SUMMARY OF THE INVENTION

The present invention concerns an apparatus having a cache and a processor. The cache may be configured to (i) buffer a first subset of reference samples of a reference picture to facilitate a motion estimation of a current block and (ii) prefetch a second subset of the reference samples while a first search pattern is being tested. The first search pattern used in the motion estimation generally defines multiple motion vectors to test. The reference samples of the second subset may be utilized by a second search pattern in the motion estimation of the current block. The prefetch of the second subset may be based on a geometry of the first search pattern and scores of the motion vectors already tested. The processor may be configured to calculate the scores of the motion vectors by a block comparison of the reference samples to the current block according to the first search pattern.

The objects, features and advantages of the present invention include providing a method and/or apparatus for implementing a cache prefetch during motion estimation that may (i) test a low possible number of hypotheses, (ii) be aware of a current search pattern, (iii) be aware of test scores already calculated for the search pattern, (iv) prefetch additional samples to a cache before the additional samples are considered, (v) prefetch the additional samples based on probabilities, (vi) avoid stalls and/or (vii) be implemented in a digital signal processor.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

A cache mechanism aware of search pattern memory accesses and of a sum of absolute differences of previously examined hypotheses may be used to predict with certainty, and/or with a probability threshold, the memory accesses that may be used later in a motion estimation process. After the memory accesses are predicted, the corresponding data (e.g., reference samples) may be prefetched to the cache to avoid stalling a core processor.

Figure 1:
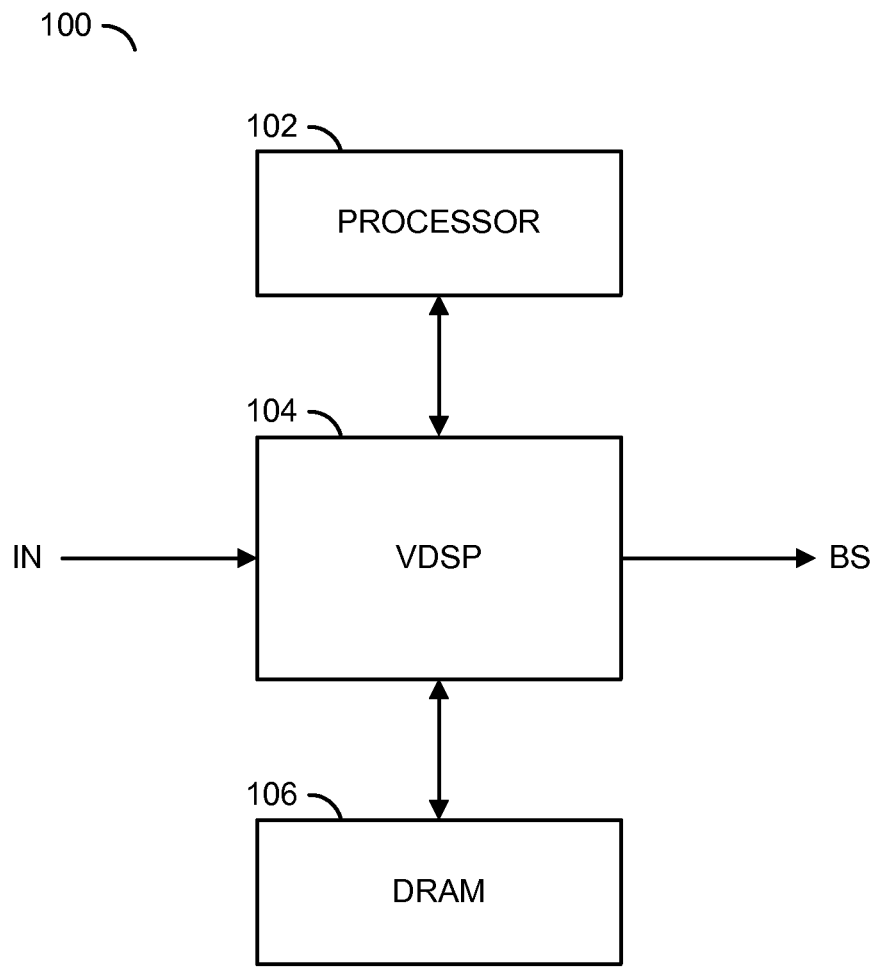
FIG. 1 is a block diagram of an example implementation of an apparatus.

Referring to FIG. 1, a block diagram of an example implementation of an apparatus 100 is shown. The apparatus (or circuit or device or integrated circuit) 100 may implement a video encoder. The apparatus 100 generally comprises a block (or circuit) 102, a block (or circuit) 104 and a block (or circuit) 106. The circuits 102-106 may represent modules and/or blocks that may be implemented as hardware, software, a combination of hardware and software, or other implementations.

The circuit 104 may be directly coupled to the circuit 102 to exchange data and control information. The circuit 104 may be coupled to the circuit 106 to exchange data. An input signal (e.g., IN) may be received by the circuit 104. A bitstream signal (e.g., BS) may be presented by the circuit 104.

The signal IN may be one or more analog video signals and/or one or more digital video signals. The signal IN generally comprises a sequence of progressive-format frames and/or interlace-format fields. The signal IN may include synchronization signals suitable for synchronizing a display with the video information. The signal IN may be received in analog form as, but is not limited to, an RGB (Red, Green, Blue) signal, an EIA-770 (e.g., YCrCb) signal, an S-video signal and/or a Composite Video Baseband Signal (CUBS). In digital form, the signal IN may be received as, but is not limited to, a High Definition Multimedia Interface (HDMI) signal, a Digital Video Interface (DVI) signal and/or a BT.656 signal. The signal IN may be formatted as a standard definition signal or a high definition signal.

The signal BS may be a compressed video signal, generally referred to as a bitstream. The signal BS may comprise a sequence of progressive-format frames and/or interlace-format fields. The signal BS may be compliant with a VC-1, MPEG and/or H.26x standard. The MPEG/H.26x standards generally include H.261, H.264, H.263, MPEG-1, MPEG-2, MPEG-4 and H.264/AVC. The MPEG standards may be defined by the Moving Pictures Expert Group, International Organization for Standards, Geneva, Switzerland. The H.26x standards may be defined by the International Telecommunication Union-Telecommunication Standardization Sector, Geneva, Switzerland. The VC-1 standard may be defined by the document Society of Motion Picture and Television Engineer (SMPTE) 421M-2006, by the SMPTE, White Plains, N.Y.

The circuit 102 may be implemented as a processor. The circuit 102 may be operational to perform select digital video encoding operations. The encoding may be compatible with the VC-1, MPEG or H.26x standards. The circuit 102 may also be operational to control the circuit 104. In some embodiments, the circuit 102 may implement a SPARC processor. Other types of processors may be implemented to meet the criteria of a particular application. The circuit 102 may be fabricated as an integrated circuit on a single chip (or die).

The circuit 104 may be implemented as a video digital signal processor (e.g., VDSP) circuit. The circuit 104 may be operational to perform additional digital video encoding operations. The circuit 104 may be controlled by the circuit 102. The circuit 104 may be fabricated as an integrated circuit on a single chip (or die). In some embodiments, the circuits 102 and 104 may be fabricated on separate chips.

The circuit 106 may be implemented as a dynamic random access memory (e.g., DRAM). The circuit 106 may be operational to store or buffer large amounts of information consumed and generated by the encoding operations and the filtering operations of the apparatus 100. As such, the circuit 106 may be referred to as a main memory. The circuit 106 may be implemented as a double data rate (e.g., DDR) memory. Other memory technologies may be implemented to meet the criteria of a particular application. The circuit 106 may be fabricated as an integrated circuit on a single chip (or die). In some embodiments, the circuits 102, 104 and 106 may be fabricated on separate chips.

Figure 2:
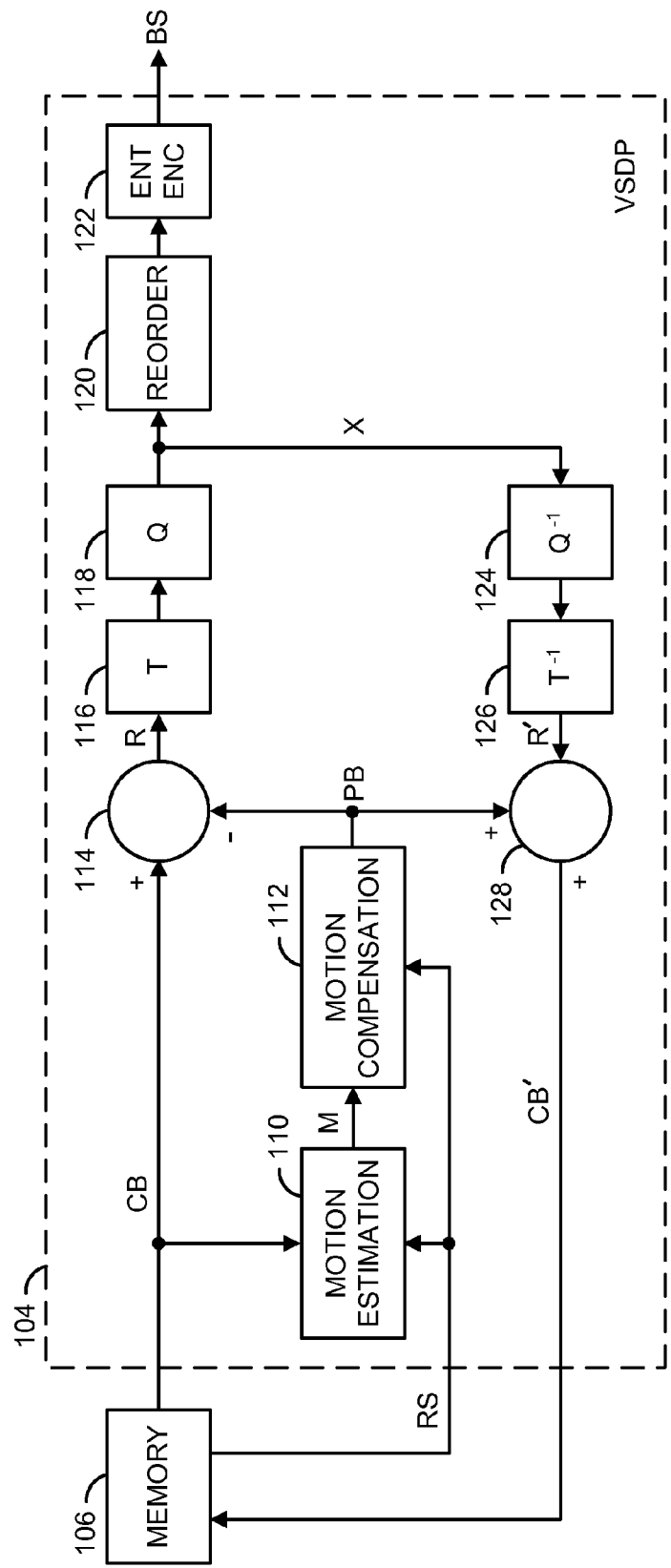
FIG. 2 is a functional block diagram of a portion of an encoding operation.

Referring to FIG. 2, a functional block diagram of a portion of an encoding operation in the circuit 104 is shown. The circuit 104 is generally operational to perform a video encoding process (or method) utilizing inter-prediction of luminance blocks of a picture. The process generally comprises a step (or state) 110, a step (or state) 112, a step (or state) 114, a step (or state) 116, a step (or state) 118, a step (or state) 120, a step (or state) 122, a step (or state) 124, a step (or state) 126 and a step (or state) 128. The steps 110-128 may represent modules and/or blocks that may be implemented as hardware, software, a combination of hardware and software, or other implementations.

The steps 110 and 114 may receive a current block signal (e.g., CB) from the circuit 106. The step 110 may generate a motion vector signal (e.g., M) transferred to the step 112. A prediction block signal (e.g., PB) may be generated by the step 112 and presented to the steps 114 and 128. The step 114 may generate a residual signal (e.g., R) received by the step 116. The step 116 may present information to the step 118. A signal (e.g., X) may be generated by the step 118 and transferred to the steps 120 and 124. The step 120 may present information to the step 122. The step 122 may generate and present the signal BS. The step 124 may transfer information to the step 126. A reconstructed residual signal (e.g., R') may be generated by the step 126 and transferred to the step 128. The step 128 may generate a reconstructed current block signal (e.g., CB') received by the circuit 106. The circuit 106 may also generate a reference sample signal (e.g., RS) presented to the steps 110 and 112.

The step 110 may implement a motion estimation step. The step 110 is generally operational to estimate a motion between a current block of a current picture (or field or frame) and a closest matching block in a reference picture (or field or frame). The estimated motion may be expressed as a motion vector (e.g., MV) that points from the current block to the closest matching reference block. The reference picture may be earlier or later in time than the current picture. The reference picture may be spaced one or more temporal inter-picture distances from the current picture. Each pixel of a picture may be considered to have a luminance (sometimes called "luma" for short) value (or sample) and two chrominance (sometimes called "chroma" for short) values (or samples). The motion estimation is generally performed using the luminance samples.

The estimation of the motion may be performed by multiple steps. The steps may include, but are not limited to, the following. An initial subset of the reference samples of a reference picture may be buffered in a cache of the circuit 104 to facilitate the motion estimation of the current block. An initial search pattern used in the motion estimation generally defines multiple motion vectors (or locations) to be tested. Multiple scores of the possible motion vectors may be calculated by a block comparison of the reference samples to the samples of the current block according to the current search pattern. Prefetching of a next subset of the reference samples to the cache may be performed while a current search pattern is being tested. The reference samples of the next subset are generally utilized by a next search pattern in the motion estimation of the current block. The prefetching of the next subset may be based on a geometry of the current search pattern and the scores of the motion vectors already tested. The motion estimation may include calculating interpolated reference samples at sub-pel locations between the integer pel locations. The sub-pel locations may include, but are not limited to, half-pel locations, quarter-pel locations and eighth-pel locations. The motion estimation may refine the search to the sub-pel locations.

The step 112 may implement a motion compensation step. The step 112 is generally operational to calculate a motion compensated (or predicted) block based on the reference samples received in the signal RS and a motion vector received in the signal M. Calculation of the motion compensated block generally involves grouping a block of reference samples around the motion vector where the motion vector has integer-pel (or pixel or sample) dimensions. Where the motion vector has sub-pel dimensions, the motion compensation generally involves calculating interpolated reference samples at sub-pel locations between the integer pel locations. The sub-pel locations may include, but are not limited to, half-pel locations, quarter-pel locations and eighth-pel locations. The motion compensated block may be presented in the signal PB. The calculated (or predicted) motion compensated block may be presented to the steps 114 and 128 in the signal PB.

The step 114 may implement a subtraction step. The step 114 is generally operational to calculate residual blocks by subtracting the motion compensated blocks from the current blocks. The subtractions (or differences) may be calculated on a sample-by-sample basis where each sample in a motion compensated block is subtracted from a respective current sample in a current block to calculate a respective residual sample (or element) in a residual block. The residual blocks may be presented to the step 116 in the signal R.

The step 116 may implement a transform step. The step 116 is generally operational to transform the residual samples in the residual blocks into transform coefficients. The transform coefficients may be presented to the step 118.

The step 118 may implement a quantization step. The step 118 is generally operational to quantize the transform coefficients received from the step 116. The quantized transform coefficients may be presented in the signal X.

The step 120 may implement a reorder step. The step 120 is generally operational to rearrange the order of the quantized transform coefficients and other symbols and syntax elements for efficient encoding into a bitstream.

The step 122 may implement an entropy encoder step. The step 122 is generally operational to entropy encode the string of reordered symbols and syntax elements. The encoded information may be presented in the signal BS.

The step 124 may implement an inverse quantization step. The step 124 is generally operational to inverse quantize the transform coefficients received in the signal X to calculate reconstructed transform coefficients. The step 124 may reverse the quantization performed by the step 118. The reconstructed transform coefficients may be transferred to the step 126.

The step 126 may implement an inverse transform step. The step 126 is generally operational to inverse transform the reconstructed transform coefficients to calculate reconstructed residual samples. The step 126 may reverse the transform performed by the step 116. The reconstructed residual samples may be presented in the signal R'.

The step 128 may implement an adder step. The step 128 may be operational to add the reconstructed residual samples received via the signal R' to the motion compensated samples received via the signal PB to generate reconstructed current samples. The reconstructed current samples may be presented in the signal CB' to the circuit 106.

Figure 3:
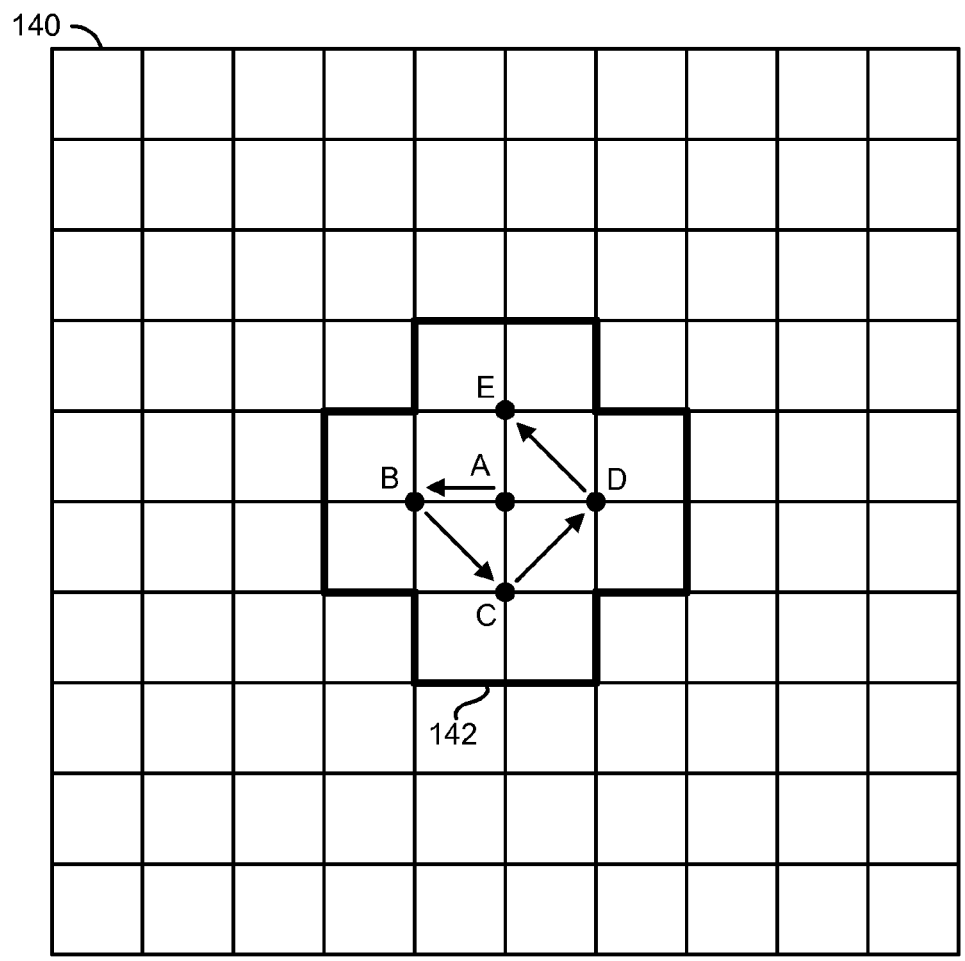
FIG. 3 is a block diagram of an example small diamond search pattern.

Referring to FIG. 3, a block diagram of an example search pattern is shown. The search may be performed in a search memory 140 within a search area 142. Each element (white square) of the search area 142 may represent one or more reference samples of a reference picture. For simplicity in explaining the motion estimation operations, each white square may be referred to as a single reference sample.

The example search pattern illustrated may implement a small diamond search (e.g., SDS) pattern. Each dot A-E generally represents a possible location (or possible motion vector) at the center of a block comparison. The locations A-E are generally illustrated at integer-pel locations. The current block being encoded in the example may be a 2×2 block of current samples. Other block sizes may be implemented to meet the criteria of a particular application.

An initial block comparison may be performed between the four samples of the current block and the four reference samples around the location A (e.g., MV=(0,0)). The block comparison generally calculates a sum of absolute differences (e.g., SAD) between the current block and the reference samples around the current location (or hypothesis). The SAD value may be considered a score of the location. Next, a block comparison may be performed between the four samples of the current block and the four reference samples around the location B (e.g., MV=(-1,0)). Similar block comparisons may subsequently be performed for the locations C, D and E. The individual scores may be compared against each other to find a best score. Because the locations outside the search area 142 are not considered by the search pattern, the corresponding reference samples may not be copied from the memory 106 into the search memory 140 before performing the initial search. In some embodiments, the reference samples may be copied from the circuit 106 in multi-sample blocks generally corresponding to a width of a memory bus and/or a length of a burst transfer. Therefore, some of the locations outside the search area 142 may contain copies of reference samples.

Figure 4:
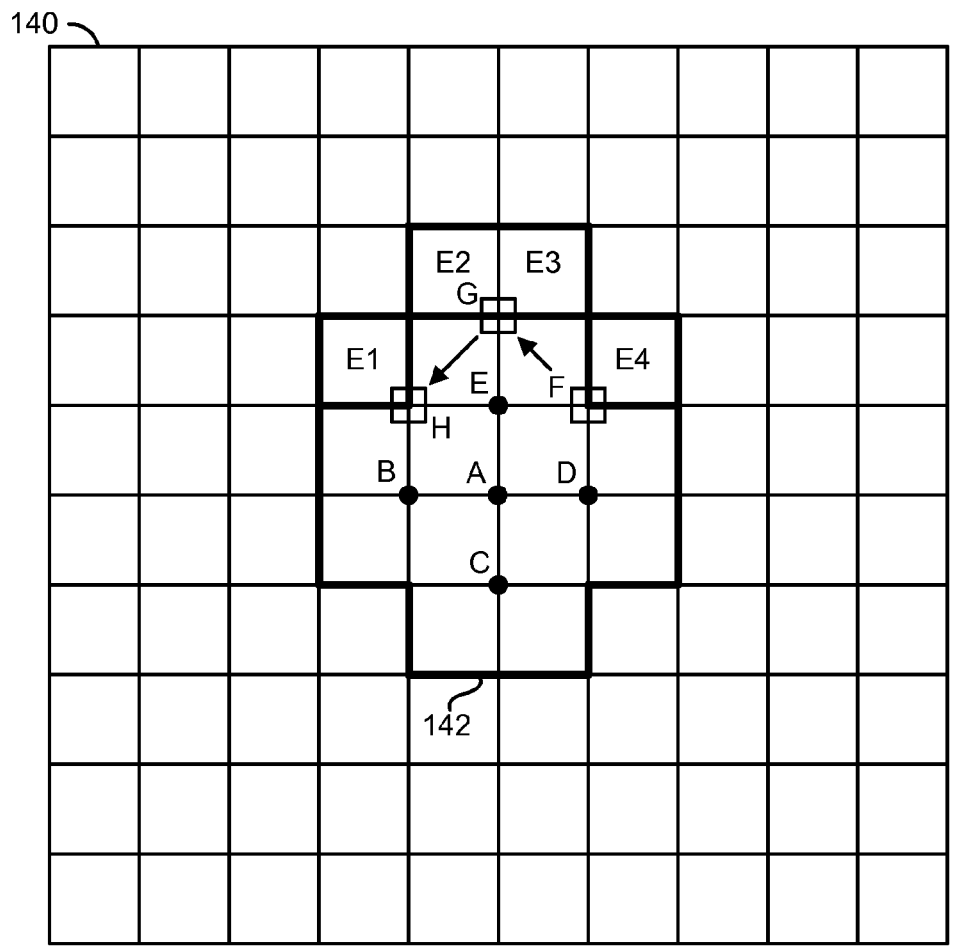
FIG. 4 is a block diagram of another example search pattern.

Referring to FIG. 4, a block diagram of another example search pattern is shown. Upon completion of the SDS search pattern illustrated in FIG. 3, the motion estimation may conclude that the location E produces the best match (best score) between the current block and the reference samples within the search area 142. A further refinement of the motion estimation may be achieved by performing block comparisons at the possible locations F-H (illustrated as small squares) around the location E. To facilitate the additional search, additional reference samples E1-E4 may be copied (fetched) into the search memory 140. The reference samples E1-E4 may be copied as individual samples and/or within larger blocks of samples. If any of the locations F-H have a better score than that of the location E, additional possible locations are searched until a final best location (best score) is found.

Figure 5:
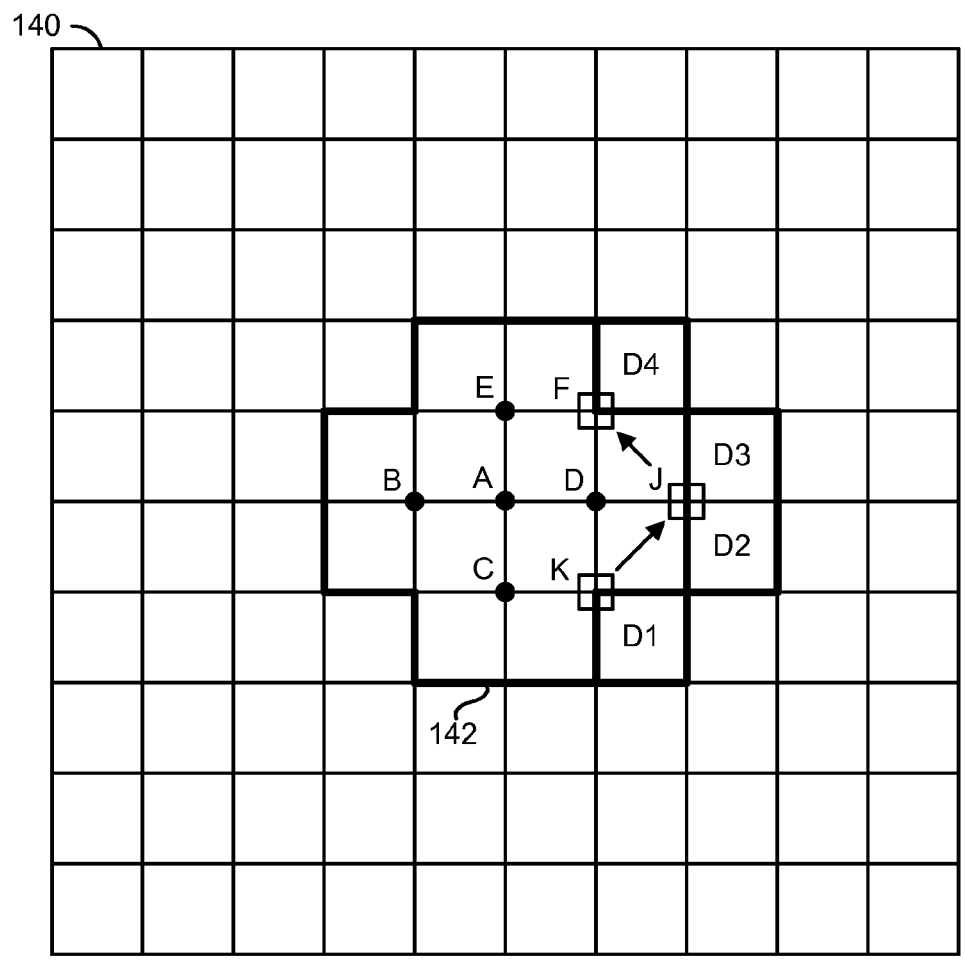
FIG. 5 is a block diagram of another example search pattern.

Referring to FIG. 5, a block diagram of another example search pattern is shown. Upon completion of the SDS search pattern illustrated in FIG. 3, the motion estimation may conclude that the location D produces the best match (best score) between the current block and the reference samples within the search area 142. A further refinement of the motion estimation may be achieved by performing block comparisons at the possible locations F, J and K (illustrated as small squares) around the location D. To facilitate the additional search, additional reference samples D1-D4 may be copied (fetched) into the search memory 140. The reference samples D1-D4 may be copied as individual samples and/or within larger blocks of samples. If any of the locations F, J or K have a better score than that of the location D, additional possible locations are searched until a final best location (best score) is found.

If the fetching of the additional reference samples (e.g., E1-E4 in FIG. 4 and D1-D4 in FIG. 5) is performed after the initial search has completed, a stall generally occurs in the motion estimation while the circuit 106 is accessed and the additional reference samples are copied into the search memory 140. Therefore, the circuit 104 may predict which reference samples should be accessed next and prefetch the reference samples (or corresponding blocks of reference samples) before the end of a search iteration. As such, the additional reference samples may be available in the search memory 140 at the beginning of the next iteration. Where multi-sample blocks are prefetched from the circuit 106, some of the reference samples within such blocks may expand the search area 142. Other reference samples within the blocks may be duplicates of samples already in the search memory 140.

A cache mechanism of the circuit 104 may be aware of the search pattern memory accesses and may be aware of the scores of the previously examined locations. The cache mechanism may predict (with certainty and/or with a probability threshold) the memory accesses that may be utilized by the motion estimation process for additional estimations. After the memory accesses are predicted, the additional reference samples may be prefetched to the search memory 140 to avoid the stalls.

Consider the following example using the small diamond search pattern of FIG. 3. Assume that the locations B and C were tested and scored worse than the center location A. The locations D and E remain to be tested during the current iteration through the search pattern. As shown in FIGS. 4 and 5, the potential additional reference samples may be E1-E4 and D1-D4. In either case, the additional reference sample D4 (same as reference sample E4) may be used in the next search pattern iteration if either of the locations E or D is determined to have the best score. Therefore, the circuit 104 may prefetch the reference sample D4/E4 before the initial search pattern iteration is finished. Once the initial search pattern iteration ends, either (i) no additional iteration may be performed because the center location A had the best score or (ii) the location F may be tested without delay. Testing location F may begin immediately upon the completion of the original search pattern because all of the samples within the original search area 142 and the reference sample D4/E4 are available in the search memory 140. While the location F is being tested, the circuit 104 may read (fetch) the other reference samples D1-D3 or E1-E3 from the circuit 106.

Figure 6:
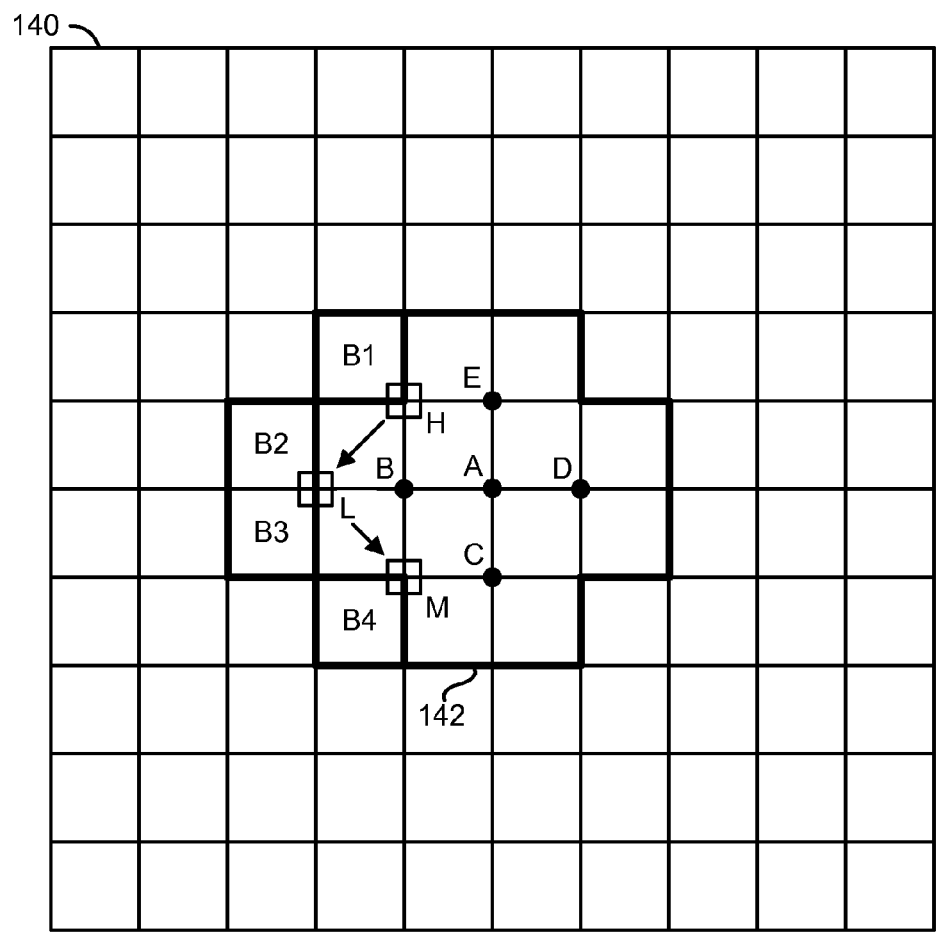
FIG. 6 is a block diagram of another example search pattern.

Referring to FIG. 6, a block diagram of another example search pattern is shown. Upon completion of the SDS search pattern illustrated in FIG. 3, the motion estimation may conclude that the location B produces the best match between the current block and the reference samples within the search area 142. A further refinement of the motion estimation may be achieved by performing block comparisons at possible locations H, L and M (illustrated as small squares) around the location B. To facilitate the additional search, reference samples B1-B4 may be copied into the search memory 140.

Returning to the example case, in some embodiments the circuit 104 may prefetch the reference sample E4/D4 once the location C is determined to have a poorer score than the location B. In addition, the circuit 104 may also prefetch the reference sample B1 (same reference sample as E1) in anticipation of either locations B or E having the best score. In other embodiments, if the location B has the current best score, the circuit 104 may not prefetch the reference sample D4/E4 until after the location D has been tested. If the score of the location D is calculated to be worse than that of the location B, the circuit 104 may prefetch the reference sample B1/E1. If the score of the location D is better than the score of the location B, the circuit 104 may prefetch the reference sample D4/E4.

Figure 7:
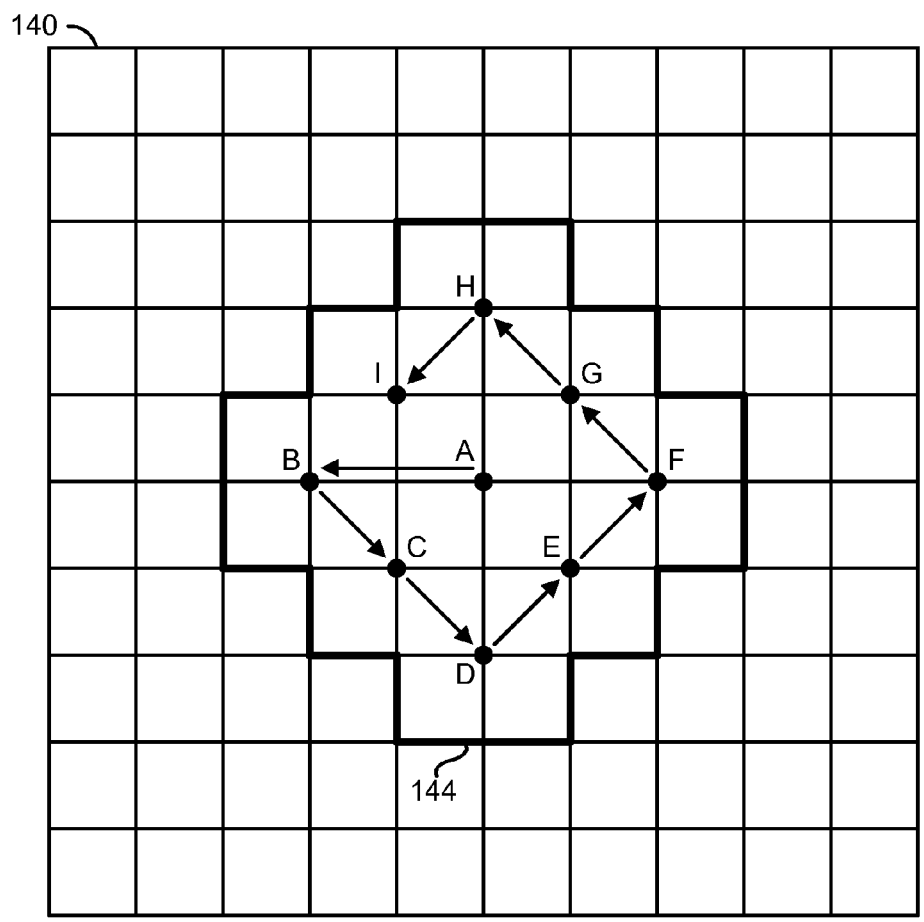
FIG. 7 is a block diagram of an example large diamond search pattern.

Referring to FIG. 7, a block diagram of an example search pattern is shown. The search may be performed in the search memory 140 within a search area 144. Each element (white square) of the search area 144 may represent one or more reference samples of a reference picture. For simplicity in explaining the motion estimation operations, each white square may be referred to as a single reference sample.

The example search pattern illustrated may implement a large diamond search (e.g., DS) pattern. Each dot A-I generally represents a possible location (or possible motion vector) at the center of a block comparison. The locations A-I are generally illustrated at integer-pel locations. The current block being encoded in the example may be a 2×2 block of current samples. Other block sizes may be implemented to meet the criteria of a particular application.

An initial block comparison may be performed between the four samples of the current block and the four reference samples around the location A (e.g., MVA=(0,0)). The block comparison generally calculates a SAD value between the current block and the reference samples around the current location (or hypothesis). The SAD value may be considered a score of the location. Next, a block comparison may be performed between the four samples of the current block and the four reference samples around the location B (e.g., MVB=(−2,0)). Similar block comparisons may subsequently be performed for the locations C-I. The individual scores may be compared against each other to find a best score. Because the locations outside the search area 144 are not considered by the search pattern, the corresponding reference samples may not be copied into the search memory 140 before performing the initial search.

Figure 8:
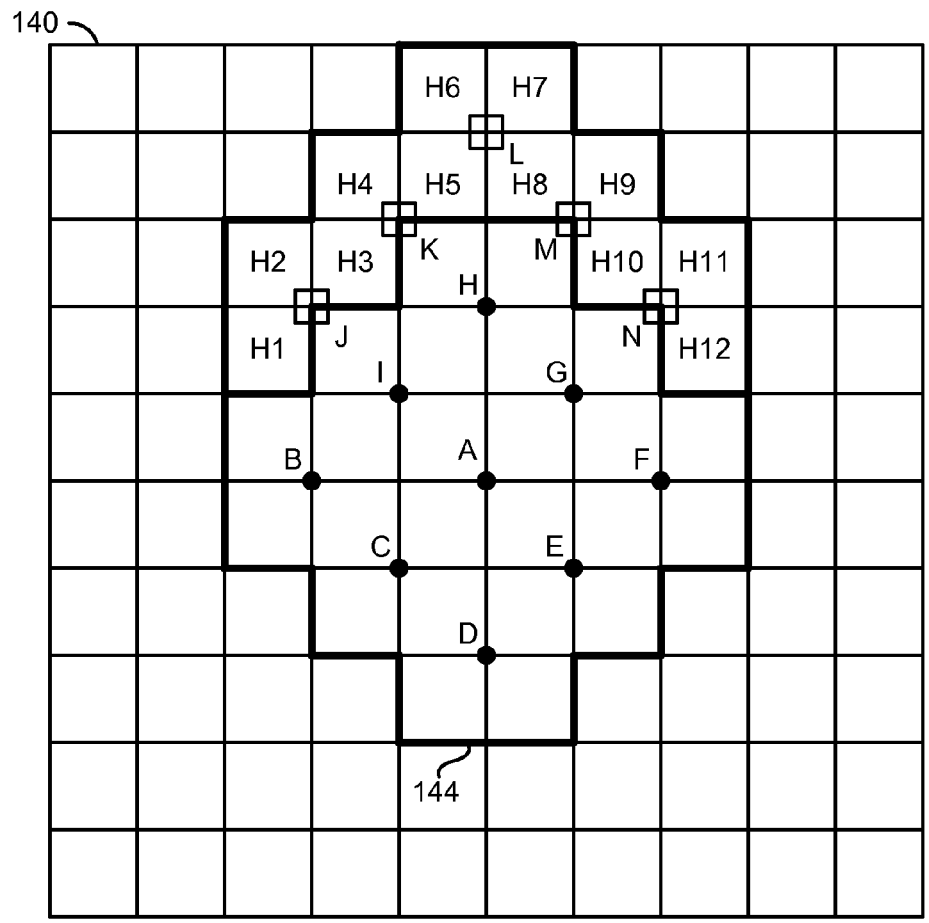
FIG. 8 is a block diagram of another example search pattern.

Referring to FIG. 8, a block diagram of another example search pattern is shown. Upon completion of the DS search pattern illustrated in FIG. 7, the motion estimation may conclude that the location H produces the best match (best score) between the current block and the reference samples within the search area 144. A further refinement of the motion estimation may be achieved by performing block comparisons at the possible locations J-N (illustrated as small squares) around the location H. To facilitate the additional search, additional reference samples H1-H12 may be copied (fetched) into the search memory 140.

Figure 9:
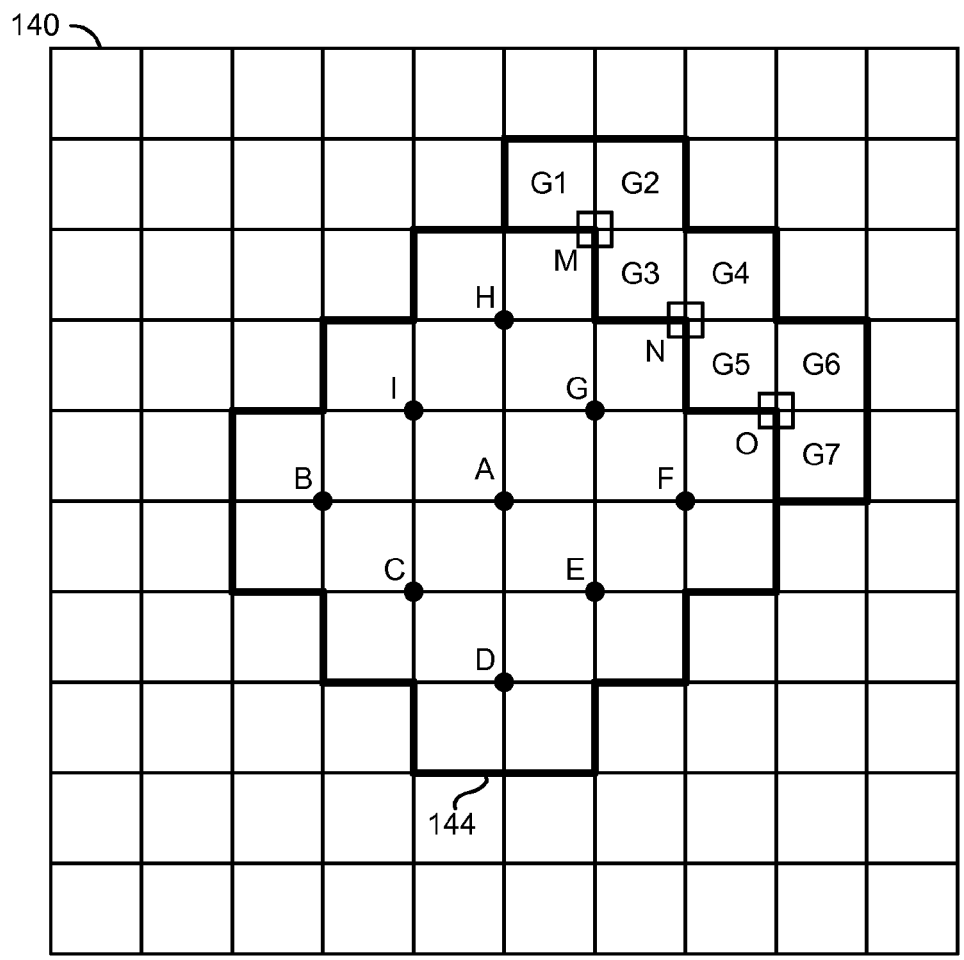
FIG. 9 is a block diagram of another example search pattern.

Referring to FIG. 9, a block diagram of another example search pattern is shown. Upon completion of the DS search pattern illustrated in FIG. 7, the motion estimation may conclude that the location G produces the best match (best score) between the current block and the reference samples within the search area 144. A further refinement of the motion estimation may be achieved by performing block comparisons at possible locations M-O (illustrated as small squares) around the location G. To facilitate the additional search, additional reference samples G1-G7 may be copied (fetched) into the search memory 140.

Consider another example using the large diamond search pattern of FIG. 7. As the motion estimation works through the initial search pattern, the locations G and H may still have to be tested by the circuit 104. If either of the locations G or H is found to have the best score, the locations M and N are generally tested in the next search pattern iteration. The common additional reference samples that would be used to test the location M may be H8 (same as G1), H9 (same as G2) and H10 (same as G3). The common additional reference sample that would be used to test the location N may be H10/G3, H11 (same as G4) and H12 (same as G5). To prepare for the possibility that the score for the locations G or H is the best score of the initial search pattern, the circuit 104 may prefetch the reference samples G1/H8, G2/H9, G3/H10, G4/H11 and G5/H12 (or corresponding blocks of reference samples) from the memory 106 to the search memory 140 in any order.

Figure 10:
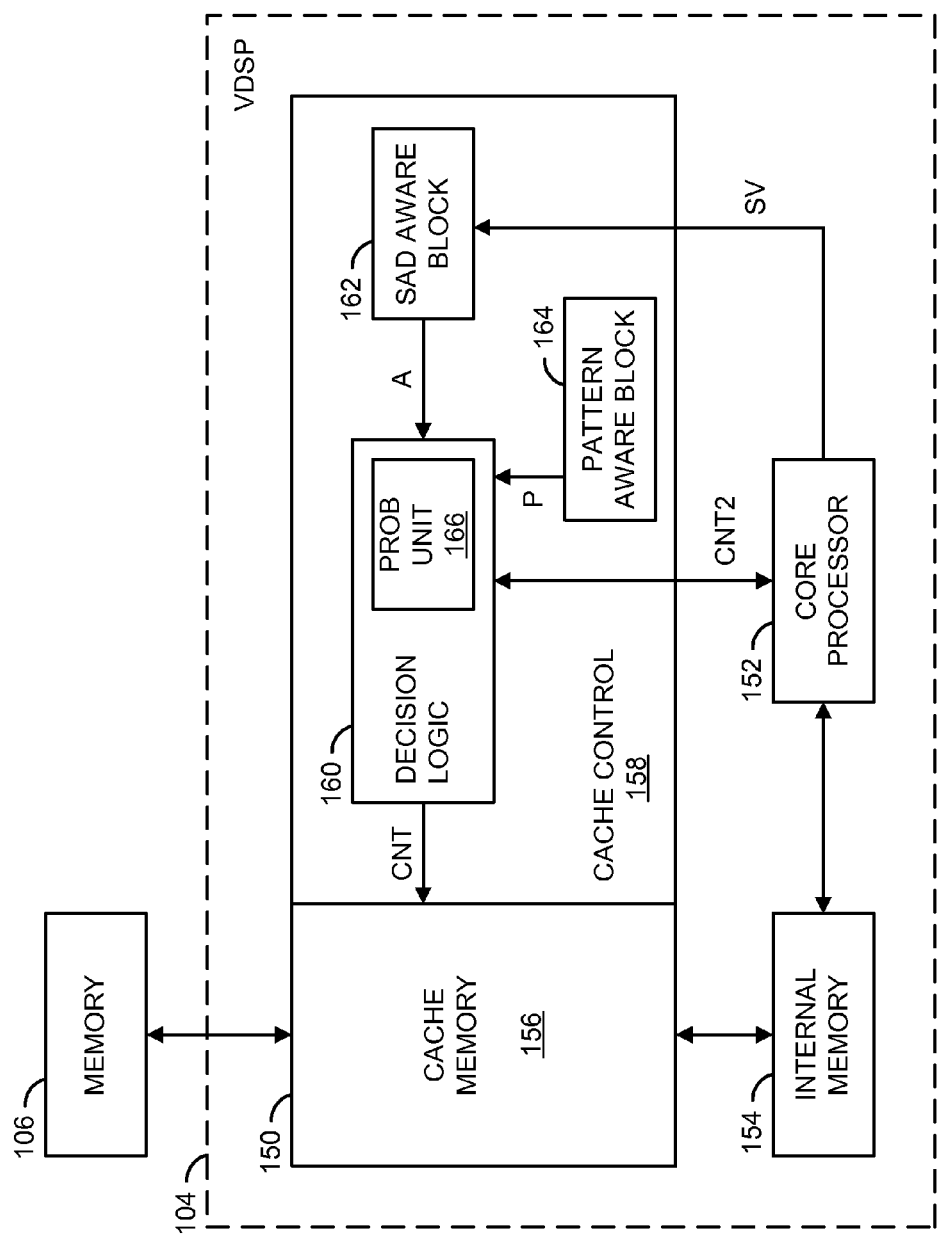
FIG. 10 is a block diagram of an example implementation of a portion of the apparatus in accordance with a preferred embodiment of the present invention.

Referring to FIG. 10, a block diagram of an example implementation of a portion of the circuit 104 is shown in accordance with a preferred embodiment of the present invention. The circuit 104 generally comprises a block (or circuit) 150, a block (or circuit) 152 and a block (or circuit) 154. The circuit 150 generally comprises a block (or circuit) 156 and a block (or circuit) 158. The circuit 158 may comprise a block (or circuit) 160, a block (or circuit) 162 and a block (or circuit) 164. The circuit 160 may include an optional block (or circuit) 166. The circuits 150-166 may represent modules and/or blocks that may be implemented as hardware, software, a combination of hardware and software, or other implementations.

The circuit 156 may be bidirectionally coupled to the circuit 106 to receive the samples. A control signal (e.g., CNT) may be generated by the circuit 160 and presented to the circuit 156. The circuit 156 may be bidirectionally coupled to the circuit 154. The circuit 152 may be bidirectionally coupled to the circuit 152. A control signal (e.g., CNT2) may be exchanged between the circuits 152 and 160. A pattern signal (e.g., P) may be generated by the circuit 164 and transferred to the circuit 160. The circuit 152 may generate a SAD value signal (e.g., SV) received by the circuit 162. A signal (e.g., A) may be generated by the circuit 162 and received by the circuit 160.

The circuit 150 may be implemented as a cache circuit. The circuit 150 is generally operational to exchange data (e.g., samples) with the circuit 106. The circuit 150 may communicate with the circuit 152 via the signal CNT2 to decide which samples to read from the memory 106.

The circuit 152 may implement a core processor circuit. The circuit 152 is generally operational to execute a plurality of program instructions (e.g., software programs). The programs may include, but are not limited to, a block comparison process. Scores calculated by the block comparisons may be transferred in the signal SV to the circuit 162. Commands to fetch samples from the circuit 106 may be generated by the circuit 152 and presented to the circuit 160 via the signal CNT2.

The circuit 154 may implement a zero-wait state internal memory circuit. The circuit 154 may be operational to store reference samples and the current block samples used in the block comparisons. The circuit 154 may be utilized by the circuit 152 as the search memory 140.

The circuit 156 may implement a cache memory. The circuit 156 may be operational to buffer one or more subsets of the reference samples of the reference picture and the current samples of the current block to facilitate the motion estimation of the current block. The reference samples and current samples fetched from the circuit 106 may be copied to the circuit 154. The samples prefetched from the circuit 106 may be (i) buffered in the circuit 156 until requested by the circuit 152 and/or (ii) copied into the circuit 154.

The circuit 158 may implement a cache control circuit. The circuit 158 is generally operational to control all operations of the circuit 156 in response to commands receive from the circuit 152, the SAD values and the search pattern.

The circuit 160 may implement a decision logic circuit. The circuit 160 is generally operational to prefetch a next subset of the reference samples while a current search pattern is being tested. The reference samples of the next subset may be utilized by a next search pattern in the motion estimation of the current block. The prefetch of the next subset of reference samples is generally based on a geometry of the current search pattern and the scores of the locations (motion vectors) already tested.

The circuit 162 may implement a SAD aware block. The circuit 162 is generally operational to buffer the SAD values (scores) of the locations already tested by the circuit 152 in the current iteration. The scores may be presented to the circuit 160 via the signal A. The scores may be used by the circuit 160 to help determine which locations have already been tested and which locations remain to be tested.

The circuit 164 may implement a pattern aware block. The circuit 164 is generally operational to buffer the current search pattern (e.g., SDS, DS, etc.) being used in the motion estimation. The current search pattern may be presented to the circuit 160 in the signal P. The current search pattern may be used by the circuit 160 to help determine which locations have already been tested and which locations remain to be tested.

The circuit 166 may implement a probabilistic decision unit. The circuit 166 is generally operational to calculate a probability that a group of one or more additional reference samples (or blocks of reference samples) may be utilized in one or more of the next search patterns before the next search pattern is established. The circuit 166 generally enables available and unused memory access slots within the circuit 156 to be filled with reference samples from the circuit 106 that are likely (e.g., the probability is greater than a threshold) to be used in a subsequent search pattern. The circuit 166 is generally useful if the circuit 104 has a long read latency from the circuit 106. Implementation of the circuit 166 within the circuit 150 avoids consuming additional processing power in the circuit 152 to predict future reference sample prefetches.

Figure 11:
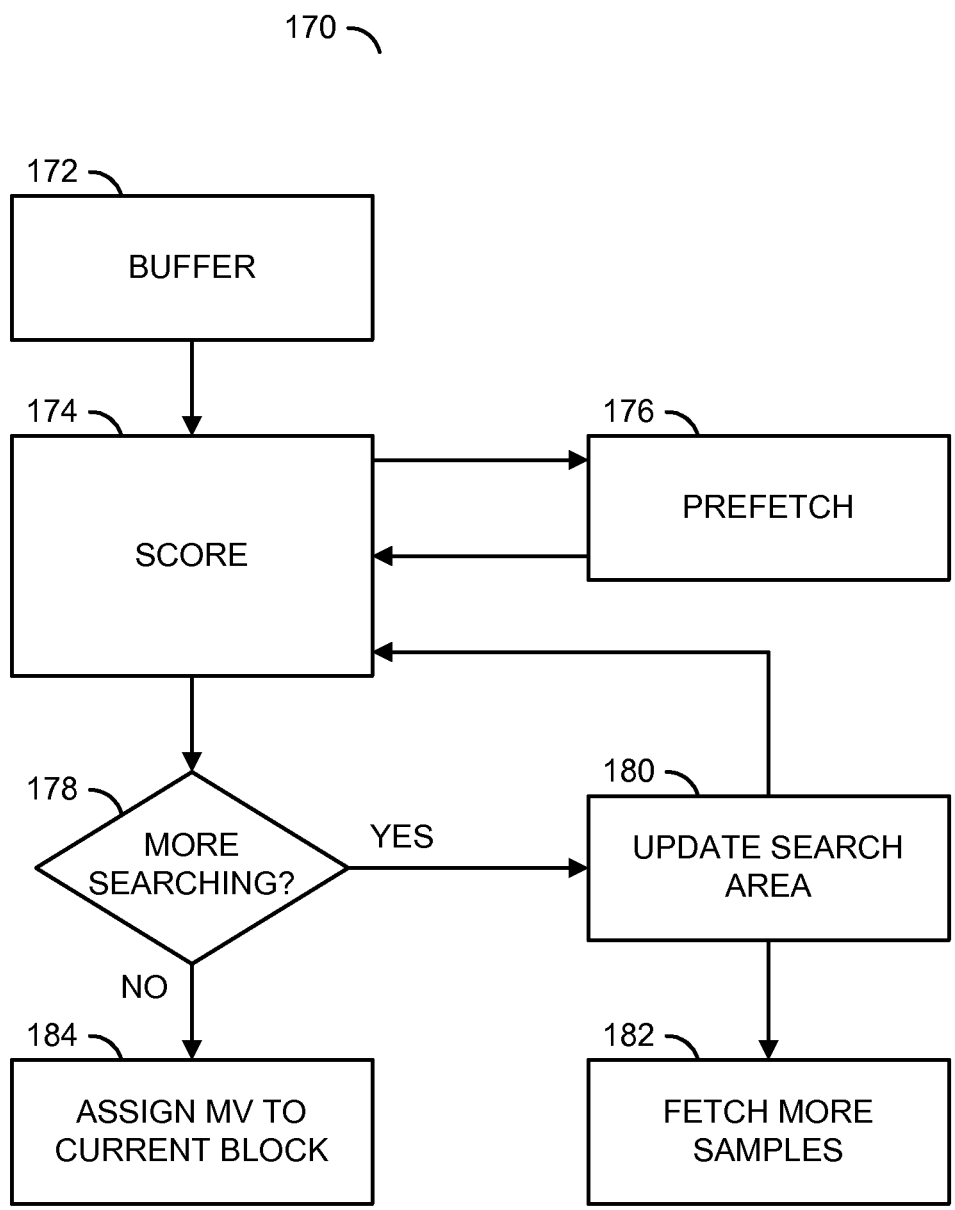
FIG. 11 is a flow diagram of an example method for cache prefetch during a motion estimation of a current block.

Referring to FIG. 11, a flow diagram of an example method 170 for cache prefetch during a motion estimation of the current block is shown. The method (or process) 170 may be implemented in the circuit 104. The method 170 generally comprises a step (or state) 172, a step (or state) 174, a step (or state) 176, a step (or state) 178, a step (or state) 180, a step (or state) 182 and a step (or state) 184. The steps 172-184 may represent modules and/or blocks that may be implemented as hardware, software, a combination of hardware and software, or other implementations.

In the step 172, the circuit 156 may buffer a current subset of the reference samples of a reference picture to facilitate the motion estimation of the current block. Where the circuit 154 implements the search memory 140, the reference samples may also be copied into the circuit 154.

In the step 174, the circuit 152 may calculate the scores of the motion vector locations by a block comparison of the reference samples to the current samples of the current block. The centers of the block comparisons may be defined according to the current search pattern. The scores may be presented from the circuit 152 to the circuit 162 in the signal SV.

As the scores are being calculated, the circuit 158 may determine in the step 176 when and which additional reference samples should be read from the circuit 106 before the current search pattern is completed. Thus, the prefetching of the step 176 may be performed in parallel (or concurrently) with the scoring of the step 174. Prefetching of the next subset is generally based on a geometry of the current search pattern and the scores of the motion vectors locations already tested. Once the determination has been made, the circuit 158 may prefetch a next subset of the (additional) reference samples to the circuit 156. The reference samples of the next subset may be utilized by the next search pattern in the motion estimation of the current block.

In the step 178, the circuit 152 may determine if any additional searches should be performed. If the current best location is inside the search area, a local minimum score has been found and the search may end. If the current best location is on a peripheral edge of the search area, the circuit 104 may continue the motion estimation in the step 180 by updating the search area. The updating generally includes loading the next search pattern into the circuit 164 based on the winning location. After the next search pattern is established, the circuit 152 may continue calculating scores in the step 174. While the circuit 152 is generating additional scores, the circuit 158 may fetch any remaining reference samples (or blocks of reference samples) to be used in just-beginning search iteration from the circuit 106 in the step 182. If the motion estimation has concluded that the best integer-pel location has been found, the motion estimation may continue the motion estimation by testing sub-pel locations. The sub-pet locations may include, but are not limited to, half-pet locations, quarter-pel locations and eighth-pet locations. Once the circuit 152 concludes that motion estimation for the current block has completed, the circuit 152 may assign the motion vector of the best location to the current block in the step 184.

Figure 12:
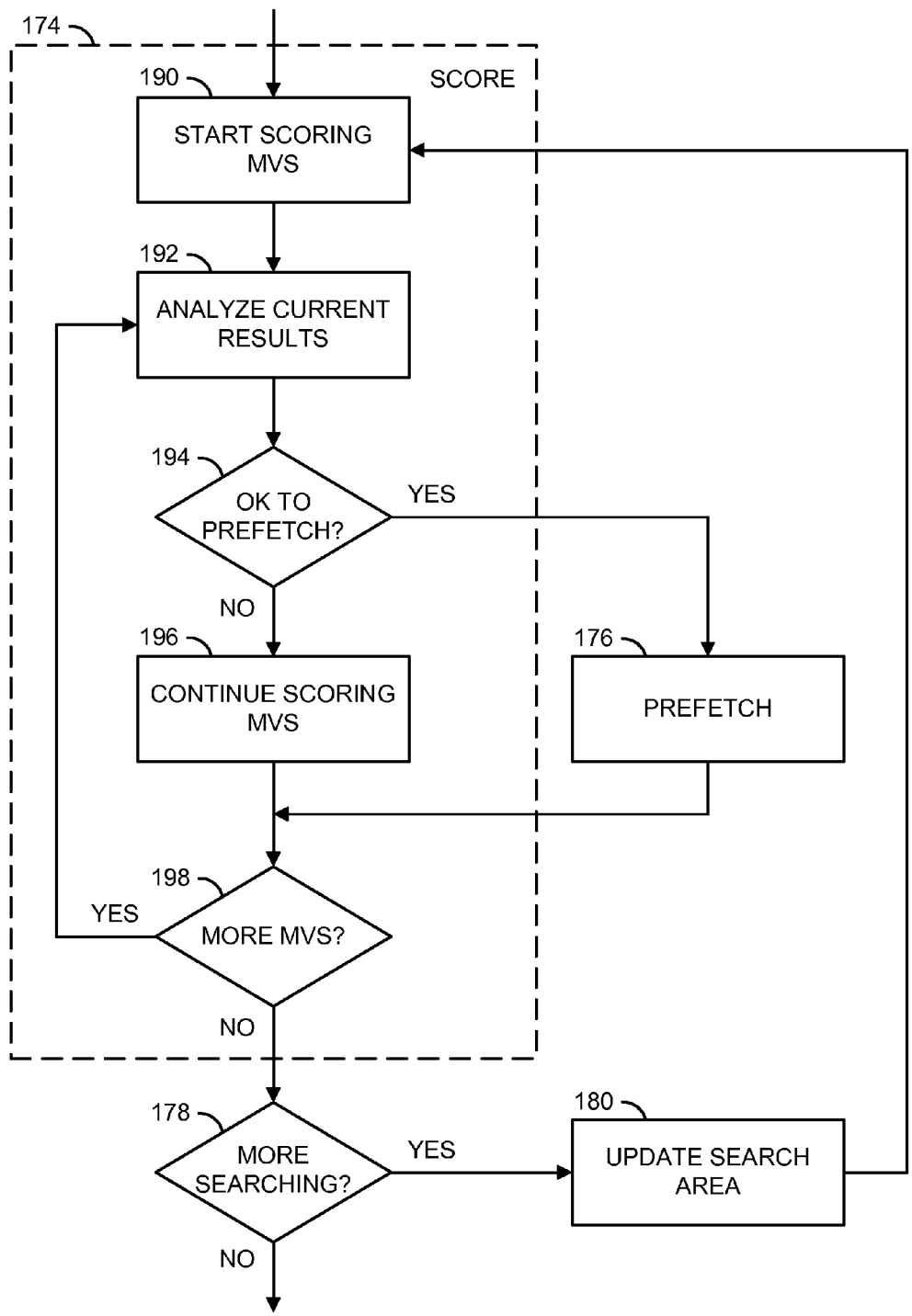
FIG. 12 is a flow diagram of an example implementation of a scoring step.

Referring to FIG. 12, a flow diagram of an example implementation of the step 174 is shown. The step 174 generally comprises a step (or state) 190, a step (or state) 192, a step (or state) 194, a step (or state) 196 and a step (or state) 198. The steps 190-198 may represent modules and/or blocks that may be implemented as hardware, software, a combination of hardware and software, or other implementations.

In the step 190, the circuit 152 may begin calculating the scores for the locations in the current search pattern. The circuit 160 may analyze the results of the initial one or more scores in the step 192. If the circuit 160 concludes that the next subset of reference samples should be prefetched, the circuit 160 may perform the prefetch in the step 176. During the prefetching, or if no prefetching is appropriate at the time, the circuit 152 may continue testing locations of the current search pattern in the step 196. A check may be performed in the step 198 to see if additional locations should be considered. If more locations are tested, the circuit 160 may continue to analyze the new scores in the step 192. The loop around the steps 192 to 198 may continue until all of the locations (potential motion vectors) have been tested.

Figure 13:
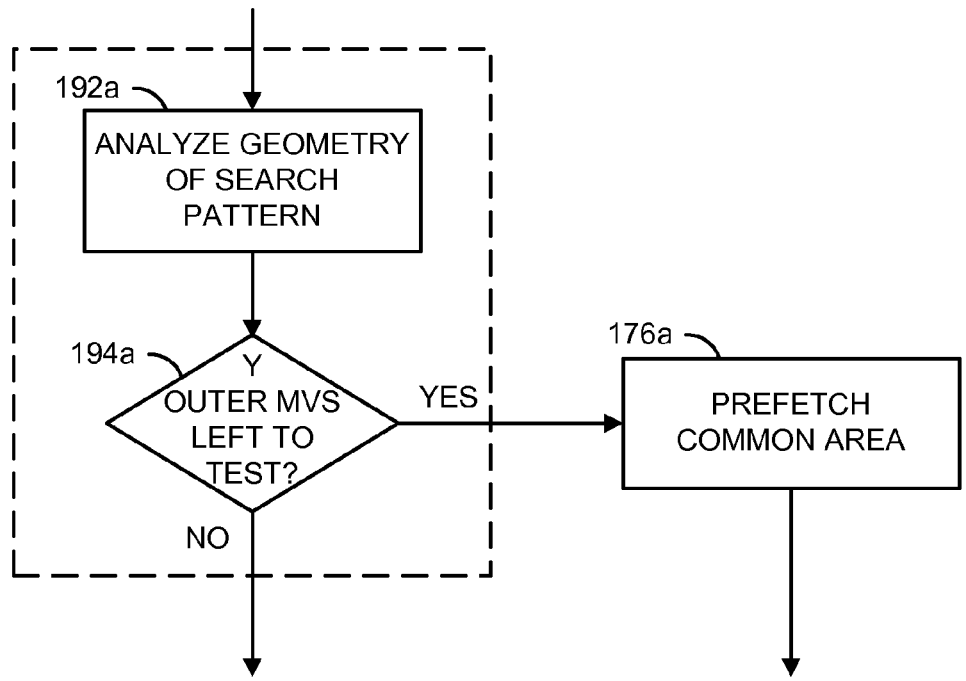
FIG. 13 is a flow diagram of an example implementation of a portion of the method.

Referring to FIG. 13, a flow diagram of an example implementation of a portion of the method 170 is shown. The method 170 may include a step (or state) 176*a*, a step (or state) 192*a* and a step (or state) 194*a*. The steps 176*a*-194*a* may represent modules and/or blocks that may be implemented as hardware, software, a combination of hardware and software, or other implementations.

In the step 192*a*, the circuit 160 may analyze the geometry of the current search pattern. If a number Y (e.g., 2) of the locations remain to be tested and the untested locations are on a periphery of the current search pattern (e.g., locations D and E), the circuit 160 may prefetch in the step 176*a* one or more additional reference samples (or blocks of reference samples) from a common area (e.g., D4/E4) that could be used in the next search pattern.

Figure 14:
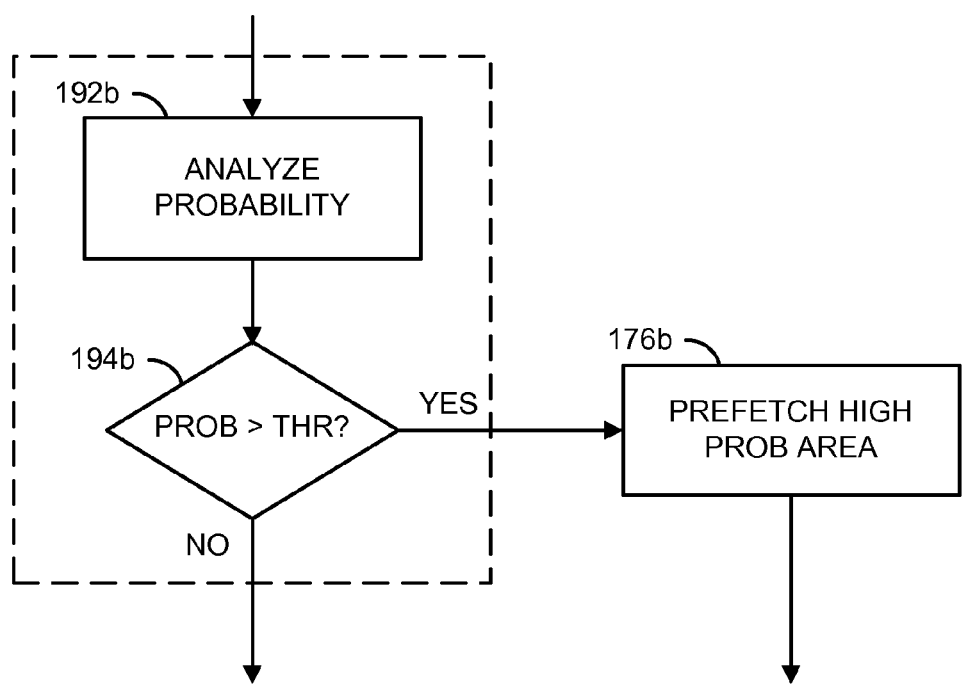
FIG. 14 is a flow diagram of another example implementation of a portion of the method.

Referring to FIG. 14, a flow diagram of another example implementation of a portion of the method 170 is shown. The method 170 may include a step (or state) 176*b*, a step (or state) 192*b* and a step (or state) 194*b*. The steps 176*b*-194*b* may represent modules and/or blocks that may be implemented as hardware, software, a combination of hardware and software, or other implementations.

In the step 192*b*, the circuit 166 may analyze the probability that one or more locations in the current search pattern may have the best score when the current search pattern ends. For each location having a probability above a threshold (THR), the circuit 160 may prefetch in the step 176*b* one or more additional reference samples (or blocks of reference samples) corresponding to each high probability area.

The functions performed by the diagrams of FIGS. 1-3 and 10-14 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

While the invention has been particularly shown and described with reference to the preferred embodiments thereof, it will be understood by those skilled in the art that various changes in form and details may be made without departing from the scope of the invention.

The invention claimed is:

1. An apparatus comprising:
  a cache configured to (i) buffer a first subset of a plurality of reference samples of a reference picture to facilitate a motion estimation of a current block and (ii) prefetch a second subset of said reference samples while a first search pattern is being tested, wherein (a) said first search pattern used in said motion estimation defines a plurality of motion vectors to test, (b) said reference samples of said second subset are utilized by a second search pattern in said motion estimation of said current block and (c) said prefetch of said second subset is based on a geometry of said first search pattern and a plurality of scores of said motion vectors already tested; and a processor configured to calculate said scores of said motion vectors by a block comparison of said reference samples to said current block according to said first search pattern.

2. The apparatus according to claim 1, wherein said second subset is utilized by said second search pattern independent of which one of said motion vectors in said first search pattern is determined to have a best of said scores when testing of said first search pattern completes.

3. The apparatus according to claim 1, wherein said first search pattern is one of (i) a diamond search pattern and (ii) a small diamond search pattern.

4. The apparatus according to claim 1, wherein while said first search pattern is being tested said cache is further configured to calculate a probability that a given one of said motion vectors will have a best of said scores when testing of said first search pattern completes.

5. The apparatus according to claim 4, wherein said cache is further configured to (i) compare said probability against a threshold and (ii) prefetch a third subset of said reference sample to said cache in response to said probability exceeding said threshold.

6. The apparatus according to claim 1, wherein (i) said processor is further configured to continue said motion estimation using said second search pattern and (ii) an initial one of said motion vectors tested in said second search pattern is scored based on said reference samples in said second subset.

7. The apparatus according to claim 6, wherein (i) said cache is further configured to fetch a third subset of said reference samples to said cache while said initial motion vector in said second search pattern is being scored and (ii) said third subset facilitates testing an additional at least one of said motion vectors in said second search pattern.

8. The apparatus according to claim 1, wherein said reference samples of said second subset are spatially outside an areas established by said reference samples of said first subset.

9. The apparatus according to claim 1, wherein said apparatus forms part of a video encoder.

10. The apparatus according to claim 1, wherein said apparatus is implemented as one or more integrated circuits.

11. A method for cache prefetch during a motion estimation, comprising the steps of:
(A) buffering in a cache a first subset of a plurality of reference samples of a reference picture to facilitate said motion estimation of a current block, wherein a first search pattern used in said motion estimation defines a plurality of motion vectors to test;
(B) calculating a plurality of scores of said motion vectors by a block comparison of said reference samples to said current block according to said first search pattern; and
(C) prefetching a second subset of said reference samples to said cache while said first search pattern is being tested, wherein (i) said reference samples of said second subset are utilized by a second search pattern in said motion estimation of said current block and (ii) said prefetching of said second subset is based on a geometry of said first search pattern and said scores of said motion vectors already tested.

12. The method according to claim 11, wherein said second subset is utilized by said second search pattern independent of which one of said motion vectors in said first search pattern is determined to have a best of said scores when testing of said first search pattern completes.

13. The method according to claim 11, wherein said first search pattern is one of (i) a diamond search pattern and (ii) a small diamond search pattern.

14. The method according to claim 11, wherein while said first search pattern is being tested the method further comprises the step of:
calculating a probability that a given one of said motion vectors will have a best of said scores when testing of said first search pattern completes.

15. The method according to claim 14, further comprising the steps of:
comparing said probability against a threshold; and
prefetching a third subset of said reference sample to said cache in response to said probability exceeding said threshold.

16. The method according to claim 11, further comprising the step of:
continuing said motion estimation using said second search pattern, wherein an initial one of said motion vectors tested in said second search pattern is scored based on said reference samples in said second subset.

17. The method according to claim 16, further comprising the step of:
fetching a third subset of said reference samples to said cache while said initial motion vector in said second search pattern is being scored, wherein said third subset facilitates testing an additional at least one of said motion vectors in said second search pattern.

18. The method according to claim 11, wherein said reference samples of said second subset are spatially outside an areas established by said reference samples of said first subset.

19. The method according to claim 11, wherein said method is implemented in a video encoder.

20. An apparatus comprising:
means for buffering a first subset of a plurality of reference samples of a reference picture to facilitate a motion estimation of a current block, wherein a first search pattern used in said motion estimation defines a plurality of motion vectors to test;
means for calculating a plurality of scores of said motion vectors by a block comparison of said reference samples to said current block according to said first search pattern; and
means for prefetching a second subset of said reference samples to said means for buffering while said first search pattern is being tested, wherein (i) said reference samples of said second subset are utilized by a second search pattern in said motion estimation of said current block and (ii) said prefetching of said second subset is based on a geometry of said first search pattern and said scores of said motion vectors already tested.

* * * * *